Sept. 16, 1969          G. E. ARMINGTON ET AL          3,467,264
                    LOAD TRANSFER AND STORAGE MECHANISM
Filed July 19, 1966                              4 Sheets-Sheet 2

INVENTORS
GEORGE E. ARMINGTON
CHARLES B. BOYTZ
BY
*Baldwin, Doran & Egan*
ATTORNEYS Sept. 16, 1969 G. E. ARMINGTON ET AL 3,467,264
LOAD TRANSFER AND STORAGE MECHANISM
Filed July 19, 1966 4 Sheets-Sheet 3

INVENTORS
GEORGE E. ARMINGTON
CHARLES B. BOYTZ
BY
Baldwin, Onan & Egan
ATTORNEYS

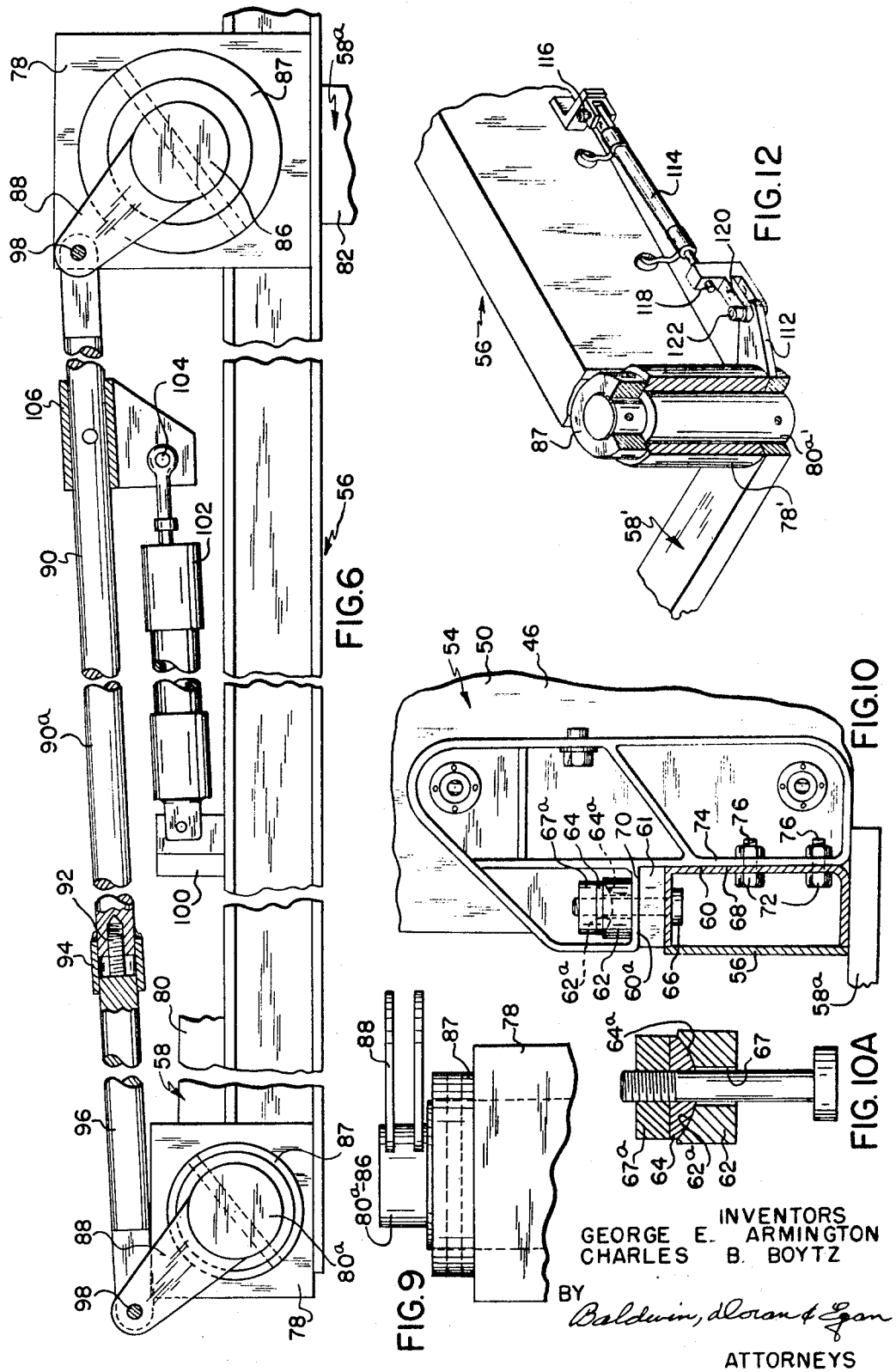

United States Patent Office 3,467,264
Patented Sept. 16, 1969

3,467,264
LOAD TRANSFER AND STORAGE MECHANISM
George E. Armington, Austinburg, and Charles B. Boytz, Garretsville, Ohio, assignors to The Euclid Crane and Hoist Company, Cleveland, Ohio, a corporation of Ohio
Filed July 19, 1966, Ser. No. 566,290
Int. Cl. E04h 6/00; B66f 9/14
U.S. Cl. 214—16.4                           9 Claims

ABSTRACT OF THE DISCLOSURE

A load transfer and storage mechanism comprising, a storage frame for receiving loads therein and a powered load carrier having an extractor portion for handling the loads. The load carrier is movable along a travel zone disposed adjacent the storage frame for depositing loads into and removing loads from the storage frame. The extractor comprises a support having a plurality of tine members spaced in lateral relation along the support, with the the tine members being adapted to support a load thereon. At least some of the tine members are movably mounted on the support for pivotal movement in a generally horizontal plane about vertical axes. In one embodiment, certain of the horizontally swingable tine members are of generally L-shaped configuration in plan view, comprising a pair of arms projecting generally perpendicularly with respect to one another. When an arm of the L-shaped tine member is in operative position, it is adapted to project generally perpendicularly outwardly from the support while the other arm of the respective pair is disposed adjacent the support. One of the arms is longer than the other arm so that the amount that the operative arm is projecting outwardly from the support can be varied by the pivoting by the tine member. A novel arrangement is provided for suspending the support on a carriage portion of the extractor, and by means of spaced hangers coacting with seats mounted on bracket means attached to the carriage portion, with the seats and hangers having coacting hemispherical bearing surfaces for providing surface bearing therebetween irrespective of an angled position of the support with respect to the carriage.

---

This invention relates in general to a load transfer mechanism for storing articles in a warehousing system, and more particularly to a novel extractor construction for a load transfer mechanism or the like.

In the copending U.S. patent application, Ser. No. 329,415 filed Dec. 10, 1963, in the name of Stewart F. Armington et al., and entitled Stacker Crane, there is disclosed a load transfer mechanism or load carrier in the form of a stacker crane of the general type with which the instant invention may be used. Such load carrier or stacker crane is supported on a pair of rails disposed parallel with a travel zone or aisle which in turn is adjacent to a storage frame having generally horizontally projecting load supporting arms, with the stacker crane being adapted to travel both horizontally and vertically in the aisle and to deposit and retrieve loads or articles from the storage frame.

The stacker crane of the aforesaid application comprises a wheeled bridge adapted to travel along the rails above the aisle for horizontal movement of the stacker crane lengthwise of the aisle, and a trolley is in turn mounted upon the bridge for movement transversely of the aisle. The trolley supports a depending mast adapted to project downwardly into the aisle adjacent the storage frame, and a hoist carriage coacts with the mast for movement vertically up and down the mast. The hoist carriage in turn supports a load handling extractor, with which the present invention is particularly concerned.

The extractor in the aforesaid pending application is adapted to be rotatable toward either the right or the left side of the aisle, and includes carriage mechanism for moving the fork of the extractor laterally of the aisle and between adjacent load supporting arms of the storage frame on either side of the aisle, for either picking up or depositing a load at a selected horizontal and vertical location. The stacker crane is preferably movable from a starting position disposed at the head end of the aisle, from which starting position the stacker crane is adapted to commence its movement into the aisle to deposit or pick-up a load in the storage frame.

The extractor fork construction heretofore utilized generally comprised an elongated back-up beam secured in generally horizontally extending relation to the laterally movable extractor carriage, with tines rigidly attached to and projecting horizontally outwardly from the beam for supporting a load thereon, either for inserting or removal of a load from the storage frame.

The present invention provides an extractor fork construction wherein at least certain of the load supporting means (e.g. tines) are movably mounted with respect to the extractor fork beam, and wherein the number of tines which are operative at one time to support a load may be selectively varied by the crane operator, depending upon the size of the load which is being handled by the stacker crane. Such an arrangement materially increases the useability of the stacker crane, and provides greater efficiency in handling of loads.

The present invention also provides novel bearing means for adjusting the extractor fork beam with respect to the extractor carriage, so that the beam can be, for instance, lined up very positively with respect to the storage frame and thus compensate for manufacturing tolerances and other dimensional differences in the warehousing system and in the crane structure, while maintaining a good bearing relationship.

Accordingly, an object of the invention is to provide a novel load handling and storing apparatus.

Another object of the invention is to provide a novel load handling and storing apparatus comprising a storage frame having load supporting means extending outwardly therefrom, and a load carrier movable in a travel zone alongside of the storage frame for inserting or withdrawing a load from the storage frame, and with the load carrier comprising a vertically extending mast and a hoist carriage movable vertically on said mast, with the hoist carriage supporting an extractor mechanism movable transversely of said travel zone for inserting or withdrawing a load from the storage frame, and with the extractor mechanism comprising generally horizontally disposed load supporting means with at least certain of the load supporting means being movably mounted for selective positioning in a generally horizontal plane.

A further object of the invention is to provide a load handling and storage apparatus of the latter mentioned type wherein the extractor comprises a back-up beam mounting generally horizontally extending tines thereon for supporting a load on the load carrier, and wherein certain of said tines are rigidly connected to the back-up beam while other of said tines are movably mounted on the back-up beam for selective positioning in a generally horizontal plane, and with there being power means for actuating the movable tines.

A further object of the invention is to provide a load handling and storing mechanism of the above discussed type wherein the back-up beam is adjustably attached to movable carriage mechanism of the extractor, and including bearing means insuring expeditious bearing contact between the back-up beam and the extractor carriage mechanism.

Another object of the invention is to provide a load carrier of the aforediscussed type wherein the fork tines are all pivotally mounted with respect to the back-up beam, and wherein the intermediate of such tines comprise arm sections of different lengths for varying the amount of extension of the intermediate tine arm sections with respect to the back-up beam upon pivoting thereof, together with power means and coacting linkage means for simultaneously pivoting the tines with respect to the back-up beam.

Other objects and advantages of the invention will be apparent from the following description taken in conjunction with the accompanying drawings wherein:

FIGURE 6 is an enlarged, generally diagrammatic, top plan view showing a section of the extractor back-up beam and the fluid power mechanism and linkage means for actuating the associated extractor tines.

FIGURE 9 is a fragmentary, elevational view of the upper portion of the pivotal mounting of one of the tines on the extractor and illustrating the means attached to the vertical trunnion of the tine adapted for attachment to the linkage means shown in FIGURE 6, for actuating the tine.

FIGURE 10 is a fragmentary, enlarged, elevational view of the support bracket means utilized to adjustably attach the extractor fork to the extractor carriage.

FIGURE 10A is an enlarged sectional detail view of the hanger means utilized with the FIGURE 10 bracket for providing a surface-to-surface bearing irrespective of the adjusted position of the beam of the extractor fork.

FIGURE 12 is a fragmentary, perspective, partially sectioned rear side view of the extractor of FIGURE 11 showing the mechanism for actuating the movable tines thereof.

Figure 1:
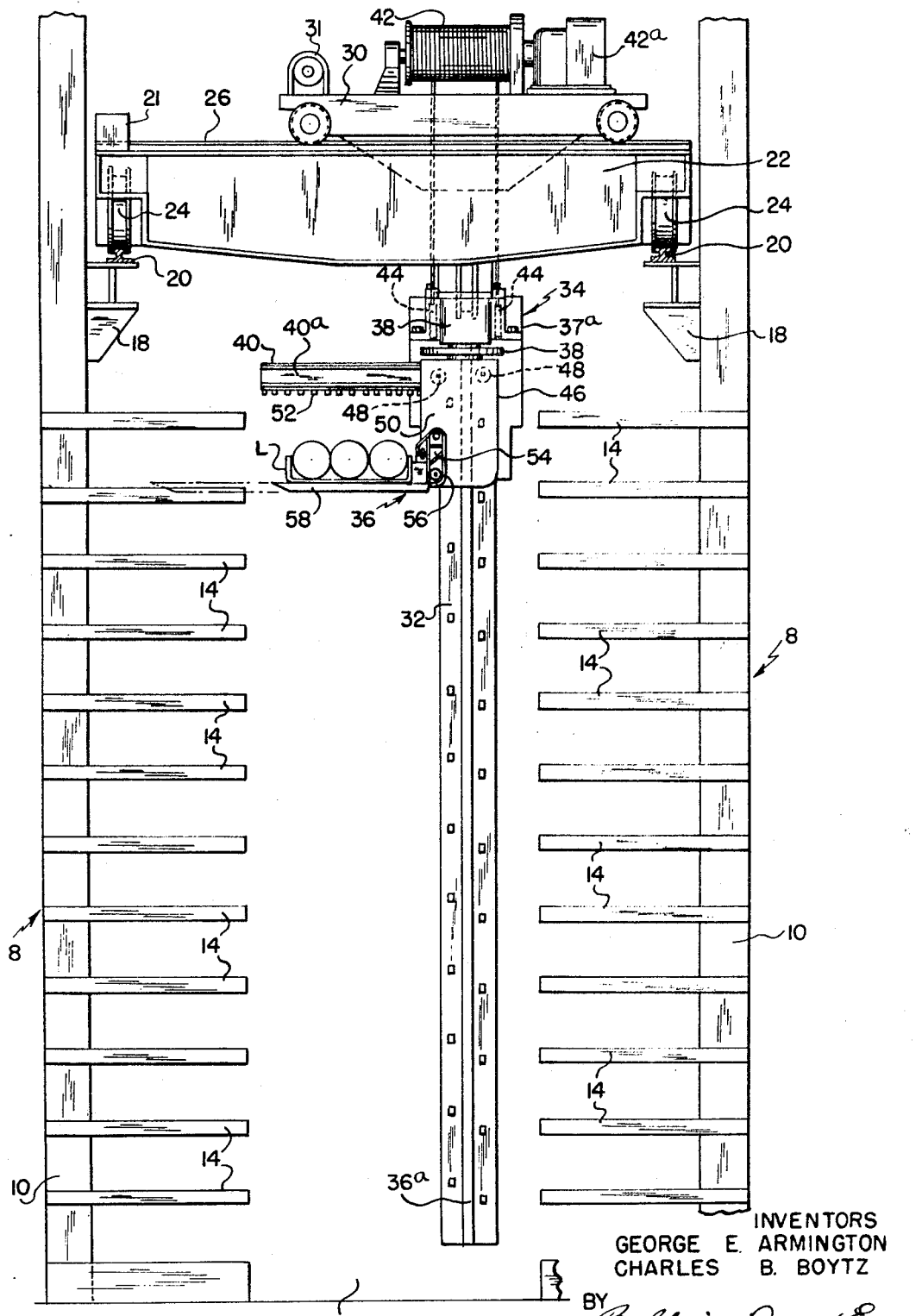
FIGURE 1 is an end elevational, generally diagrammatic view of a load handling and storage mechanism embodying the instant invention.

Referring now again to the drawings, the warehousing storage frame structure 8 herein illustrated comprises parallel rows of vertical posts 10 defining between them an aisle or travel zone 12, with the posts supporting a plurality of vertically spaced storage load supports 14, which in the embodiment illustrated comprise cantilevered arms extending generally horizontally away from the posts toward the aisle.

In the embodiment illustrated, the posts 10 are provided with supports 18 mounting rails 20 thereon, which rails extend parallel to the aisle above the load supporting means 14, and with there being provided a mobile bridge 22 extending across the aisle and being supported for movement lengthwise of the aisle as by means of the wheels 24 coacting in rolling engagement with the rails 20. Bridge 22 may be actuated for movement on rails 20 by any suitable power means, such as for instance an electric motor 21 suitably coupled to wheels 24. Mounted on the bridge 22 are rails 26 extending transversely of the bridge, and which support a trolley 30 which in turn supports a depending mast 32 extending downwardly into the aisle. Trolley 30 may be actuated on rails 26 by any suitable means, such as for instance an electric motor 31 suitably coupled to the wheels of the trolley. It will be seen that transverse movement of the trolley with respect to the bridge moves the mast with the trolley transversely of the aisle.

Mounted on the mast for vertical movement with respect thereto is a hoist structure 34, with the hoist structure supporting an extractor mechanism 36. The hoist 34 may include a suitable sleevelike member 34a (FIGURE 2) which has a central vertical opening therethrough for receiving the mast and vertically extending replaceable guide bars 36a on opposite sides of the mast. The hoist may support a cab 37 on one side of the mast, in which cab an operator may ride with suitable controls 37a for actuating the stacker crane. On the opposite side of the mast, the hoist may support a turretlike-bearing member 38 rotatably mounting a turret member 38a which supports the extractor means 36, thereby providing for movement of the extractor either to the right or to the left-hand side of the mast, or any intermediate position, and thus providing for insertion or retraction of loads either to the right-hand side or left-hand side of the storage frame 8. A reversible electric motor disposed in the turret-bearing member 38 may be utilized to rotate the turret 38a.

Secured to the turret member for rotation therewith is a cantilevered support framework 40 which mounts two spaced parallel preferably replaceable tracks 40a which support the extractor 36. A winch mechanism 42 and suitable power means 42a coupled thereto, such as for instance an electric motor, may be mounted on trolley 30 and suitably attached as at 44 to the hoist 34, for moving the latter vertically with respect to mast 32.

The extractor 36 may comprise a carriage 46 of fabricated framelike construction having wheels 48 rotatably mounted on the side plates 50 of the carriage 46, and disposed in rolling coaction with the tracks 40a and supporting the extractor for horizontal movement on the tracks 40a. Suitable power means such as a reversible electric motor may be provided for driving the extractor horizontally on the tracks 40a and such motor in the embodiment illustrated is adapted to actuate a gear means drivingly engaged with a rack 52 mounted on the bottom of each of the parallel tracks 40a for moving the extractor carriage 46.

Exterior support means such as the fabricated brackets 54 (FIGURES 2 and 10) may be provided on each of the side walls 50 of the extractor carriage, which brackets are adapted to adjustably mount the load support means or extractor fork. The extractor fork may comprise beam member 56 which is adapted to carry the fork tines 58, 58a which in turn are adapted to support a load L (FIGURE 1) thereon. As can be seen, each bracket 54 comprises a recessed portion 60 including a generally horizontal flange 60a which flange overlies the fork beam 56. Reference number 61 designates a bar which may be attached as by means of welds to the top surface of the beam 56. As may be best seen in FIGURE 2, such bar 61 preferably does not extend beyond the brackets 54 in a direction lengthwise of the beam 56. Flange 60a may support a seat member 62 having a generally upwardly facing substantially hemispherical bearing seat 62a which is adapted to coact in relative movable relation with a washer 64 having a generally hemispherical undersurface 64a formed complementary to the hemispherical seat surface 62a of the seating member. A hanger means may be provided, such as bolt 66, which may be fixed to the fork beam 56 and may pass in generally loose relation through an axial passageway 67 (FIGURE 10A) in the seat member and in generally snug relation through a passageway in the washer member 64 to coact with a nut 67a to hold the fork beam 56 in supported relation on the associated bracket 54, and thus in supported relation on the extractor carriage 46.

Thus, it will be seen that adjustment of the fork beam can be accomplished, for instance, by placing shims between the beam and the support bracket 54 as at 68 and 70, to insure that the beam is level and in parallel relation with the aisle of the storage frame, while still maintaining a good surface bearing relationship between the seat 62 and the washer 64 irrespective of any angled condition of the washer 64 and bolt and nut 66, 67a with respect to the seat 62. After shimming and alignment of the fork beam is accomplished, bolts 72 extending through openings in the fork beam and in the confronting wall 74 (FIGURE 10) of the bracket member 54, may coact with nuts 76 to rigidly secure the fork beam to the associated bracket. Thus, it will be seen that the fork box is expeditiously adjustable by proper shimming of the beam with respect to the supporting bracket members 54 while maintaining a good surface-to-surface bearing relation between the hanger means 66, 64, 67a and the seat member 62.

The tines in the embodiment illustrated in FIGURES 2 through 9 comprise end tines 58 and intermediate tines 58a. The end tines 58 are pivotally supported on the bearing housing portions 78 of the fork beam 56 and with each of such tines comprising a generally horizontally extending load supporting portion 80 and a trunnion portion 80a disposed generally perpendicular to said load supporting portion 80 and being supported in rotative relation on the associated housing portion 78 of the fork beam. The intermediate tines 58a comprise generally L-shaped members in plan view defining load supporting arm sections 82, 84, with there being an upstanding trunnion portion 86 at the juncture of the shorter arm 84 of the L-shaped tine member with the longer arm 82 thereof, and with such upstanding trunnion portion 86 being received in rotative relation in the associated housing portion 78 projecting rearwardly from the fork beam 56. Collars 87 coupled to the respective trunnion 86, 80a may hold the tine trunnions in rotatably assembled relation with the respective housing 78.

Figure 3:
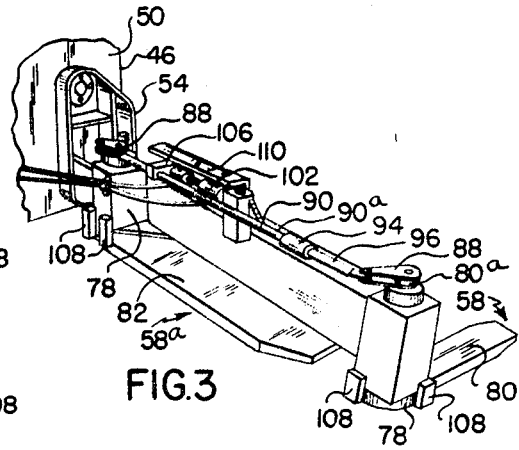
FIGURE 3 is a fragmentary, reduced size rear perspective view of a portion of the extractor fork, and showing in particular the mechanism for actuating the fork tines.
Figure 4:
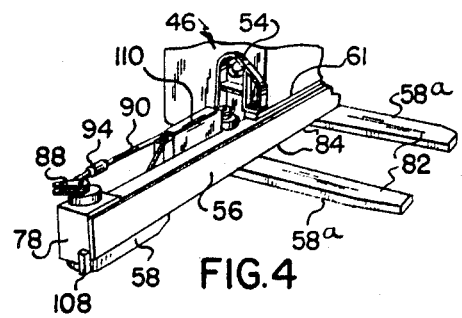
FIGURE 4 is a fragmentary, front perspective view of the extractor fork, and showing the end tines having been pivoted to inactive position and the intermediate tines having been pivoted so as to present the larger tine arm sections extending from the extractor.

As can be best seen in FIGURES 3, 6 and 9, the trunnions 80a, 86 at their upper ends may mount generally radially extending arms or brackets 88 which in turn are coupled to one another by means of an elongated link 90. Such link 90 preferably comprises a section 90a to which is detachably coupled, as by means of a threaded shank 92 and a coacting collar portion 94, a shorter length section 96. It will be seen that rotation of the shorter length linkage section 96 with respect to the longer length linkage section 90a will adjust the length of the linkage, and thus provide for adjusting the relative positions of the tines with respect to one another. Link 90 is pivotally connected to arms 88 as by means of preferably removable pins 98.

Pivotally mounted on a bracket 100 extending from the rearward side of the fork beam 56 may be a double acting, fluid powered motor unit 102, with the piston rod thereof being pivotally coupled as at 104 to a bracket 106 coupled to the link member 90. It will be seen that upon extension of the hydraulic motor unit 102 due to application of pressurized fluid thereto, the link member 90 will be driven in a direction toward the right (as viewed in FIGURE 6) thus causing rotational movement of the associated trunnions 80a, 86 and pivoting of the associated tines 58, 58a. In the position of the motor units 102 shown in FIGURES 2 and 3 it will be seen that all of the shorter length tines including the end tines and the shorter arms 84 of the intermediate tines 58a have been pivoted outwardly and are in condition suitable for supporting a load thereon, while the longer arms 82 of the intermediate tines 58a have been pivoted outwardly and are in condition suitable for supporting a load thereon, while the longer arms 82 of the intermediate times 58a are disposed beneath the fork beam 56 and in general alignment therewith.

Figure 2:
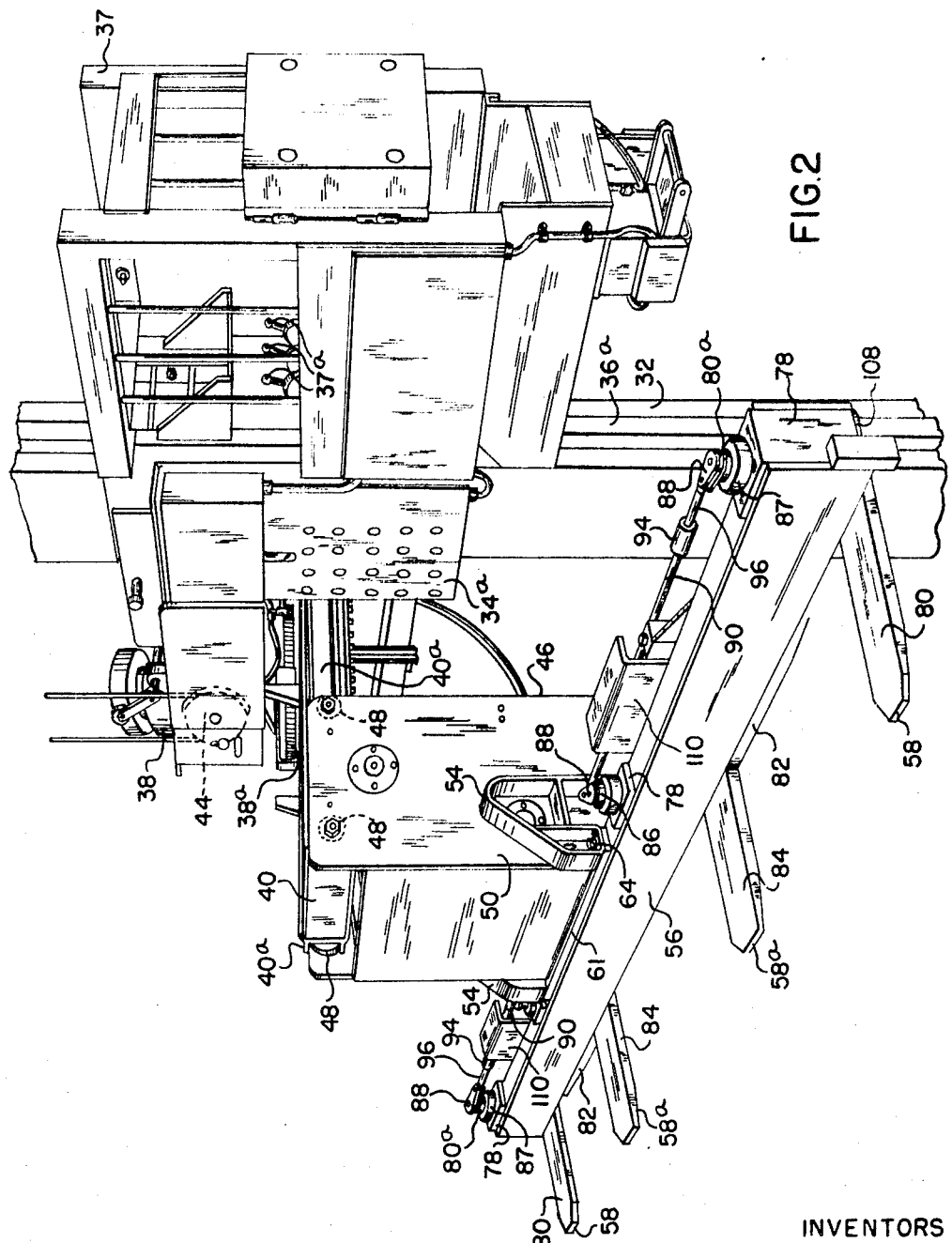
FIGURE 2 is an enlarged perspective view of the vertically movable hoist carriage and the extractor mechanism of the load handling mechanism of FIGURE 1, and illustrating one embodiment of the extractor fork wherein all of the tines are movably mounted on the extractor fork and with all of the tines being shown in laterally extending generally horizontally oriented condition for supporting a load.
Figure 5:
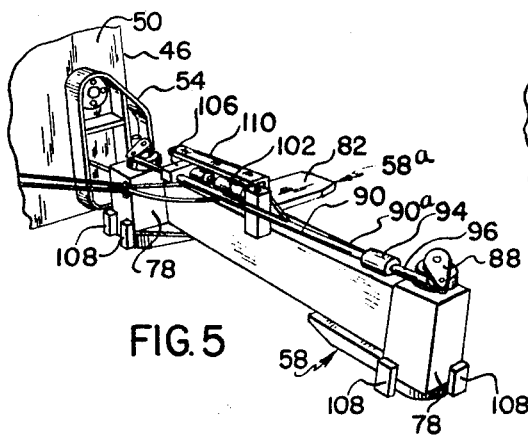
FIGURE 5 is a fragmenary, rear perspective view of a portion of the extractor fork with the tines in the positions shown in FIGURE 4.

Upon actuation of the motor units 102 to move each of the link means 90 from the positions illustrated in FIGURE 2 in directions toward the extractor carriage 46, the end tines 58 pivot inwardly toward disposal beneath the fork beam, while the longer arm sections 82 of the intermediate tines 58a pivot outwardly to be disposed in condition for supporting a load thereon. Any suitable control means such as a conventional distributing valve including a pressure relief section may be provided, as for instance in the cab 37, for controlling the actuation of the motor units 102. Stops 108 may be provided for positively limiting the pivotal movement of the tines 58, 58a, and shields 110 fastened to the work beam 56 may be provided for protecting the motor units 102.

Figure 11:
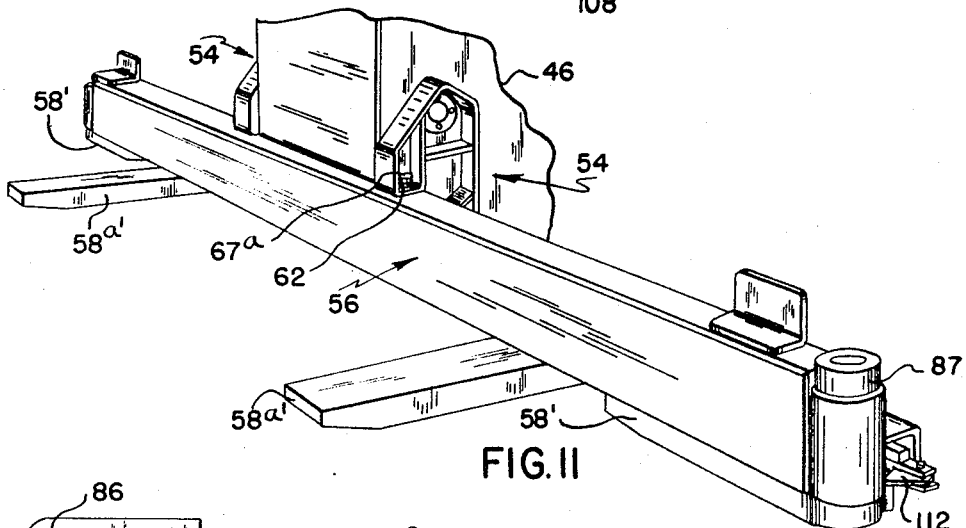
FIGURE 11 is a fragmentary perspective view of the extractor mechanism showing a modified form of extractor fork, with certain of the tines being rigidly secured to the back-up beam of the extractor while other of the tines are movable with respect to the beam.
Figure 7:
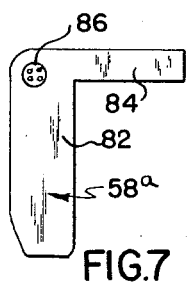
FIGURE 7 is an enlarged, top plan view of one of the aforementioned intermediate tine members, illustrating the different length arm sections thereof.
Figure 8:
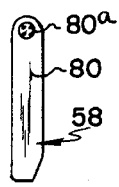
FIGURE 8 is an enlarged top plan view of one of the aforementioned end tine members.

Referring now to FIGURES 11 and 12, there is shown a modified form of the extractor construction. In this modified form, the intermediate tines 58a' of the fork construction are of generally linear configuration similar to the end tines 58' and are generally rigidly connected to the back-up beam 56 while the end tines 58' are pivoted with respect to the beam in a generally similar manner as aforediscussed in connection with the first described embodiment of the invention. Such end tines 58' may have an arm 112 attached thereto and extending from the rear side of the back-up beam, as best shown in FIGURE 12.

A double-acting, reciprocal fluid powered motor unit 114 may be provided, pivotally attached to the beam 56 as at 116 and attached as at 118 to a link member 120 which in turn is pivotally coupled to the arm 112, as at 122. It will be seen that upon extension of the piston rod of the motor unit 114, the link 120 coupled to the arm 112 will cause rotation of tine trunnion 80a' in housing 78' and pivoting of the associated tine 58' inwardly toward the back-up beam, whereupon it will be disposed beneath the beam in the fully pivoted position of the tine. Thus the extractor fork can be provided either with a full complement of tines, or in other words, both end and intermediate tines, or only with the intermediate tines. In other respects the load handling mechanism may be generally similar to the first described embodiment.

From the foregoing description and accompanying drawings it will be seen that the invention provides a novel load handling and storing mechanism comprising an extractor including spaced load supporting means movably supported on the extractor for varying the number of load supporting means which are operative at one time to support a load, thereby increasing the useability of the load handling mechanism and providing for greater efficiency in handling loads. The invention also provides a load handling and storage mechanism including an extractor comprising a movable carriage and an extractor fork mounted on the carriage with novel means for adjusting the extractor fork with respect to the extractor carriage while maintaining a good bearing relationship between a supporting beam of the fork and the carriage, and providing for aligning of the beam very accurately with respect to the storage frame and the other components of the load handling mechanism.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a load transfer and storage mechanism comprising a storage frame for receiving loads therein, a load carrier having an extractor for handling loads, said load carrier being movable along a travel zone disposed adjacent said storage frame for depositing loads into and removing loads from the storage frame, said extractor including a support and a plurality of tine members disposed in laterally spaced relation along said support, said tine members being adapted to support loads thereon, at least some of said tine members being movably mounted on said support for pivotal movement in a generally horizontal plane, certain of said movable tine members each comprising a pair of generally horizontally oriented arms disposed generally perpendicularly with respect to one another for swinging movement of the arms in said generally horizontal plane forwardly of said support to present one of the arms thereof in operative position, each of said arms of each pair when in said operative position being adapted to project generally perpendicularly outwardly from said support for supporting a load on the last mentioned arm while the other arm of the respective pair is disposed in inoperative position extending generally adjacent said support, and wherein one arm of each pair is of a greater length than the other arm of the respective pair for varying the extent of forward projection of the operative load supporting arm with respect to the support.

2. In a load transfer and storage mechanism comprising a storage frame for receiving loads therein, a load carrier having an extractor for handling loads, said load carrier being movable along a travel zone disposed adjacent said storage frame for depositing loads into and removing loads from the storage frame, said extractor including a carriage movable transverse of said travel zone toward and away from said storage frame, an elongated generally horizontally oriented support member coupled to said carriage and a plurality of tine members spaced in lateral relation along said support member, said tine members being adapted to support loads thereon, at least some of said tine members being movably mounted on said support member for pivotal movement in a generally horizontal plane, certain of said movable tine members comprising a pair of generally horizontally oriented arms disposed generally perpendicular with respect to one another in coupled relation for swinging movement of the respective tine member in said generally horizontal plane forwardly of said support member to present one of the arms thereof in operative position, each of said arms of each pair when in said operative position being adapted to project generally perpendicularly outwardly from said support member for supporting a load on the last mentioned arm, while the other arm of the respective pair is disposed in inoperative position extending generally adjacent said support member, power means coacting with said tine members for swinging the arms thereof from inoperative to operative position and vice versa, and wherein one arm of each pair is of greater length than the other arms of the respective pair, for selectively varying the extent of forward projection of the operative load supporting arm with respect to said support member upon pivoting of the respective tine member.

3. A load transfer and storage mechanism in accordance with claim 2 wherein there are provided end tine members disposed adjacent the respective end of said support member and intermediate tine members disposed intermediate said end tine members and in general horizontal alignment therewith, said end tine members being pivoted to said support member and comprising a single arm of predetermined length adapted for swinging movement in said horizontal plane, said single arm projecting generally perpendicularly outwardly from said support member when in operative load supporting position and extending generally parallel to said support member when in inoperative position, said intermediate tine members each comprising a pair of said arms and being pivoted to said support member for swinging movement in said horizontal plane, the shorter arm of each of said pairs being of substantially the same length as the length of the arm of said end tine member, linkage means coacting with said end tine members and said intermediate tine members for swinging the latter in unison about their pivotal axes, and power means for actuating said linkage means, said linkage means being so arranged that said shorter arm of each pair is swung to operative position while the longer arm of the respective pair is swung to inoperative position when the arms of said end tine members are swung to operative position, and the longer arm of each pair is swung to operative position while the shorter arm of the respective pair is swung to inoperative position when the arms of said end tine members are swung to inoperative position.

4. In a load transfer and storage mechanism comprising a storage frame for receiving loads therein, a load carrier having an extractor for handling loads, said load carrier being movable along a travel zone disposed adjacent said storage frame for depositing loads into and removing loads from said storage frame, said extractor including a carriage movable transverse of said travel zone toward and away from said storage frame, an elongated generally horizontally oriented support member having a plurality of laterally spaced generally horizontally extending load supporting elements mounted on said support member and adapted to project therefrom, at least some of said load supporting elements being movably mounted on said support member for swinging movement in a generally horizontal plane, bracket means secured to said carriage, and a plurality of spaced means coupling said bracket means to said elongated support member, each of the last-mentioned spaced means comprising a seat member supported on said bracket means and hanger means coacting with each of said seat members and with said elongated support member to suspend the elongated support member on said bracket means, and means on said seat members and on said hanger means for providing surface bearing therebetween irrespective of an angled position of said elongated support member with respect to said carriage.

5. A load transfer and storage mechanism in accordance with claim 4 wherein at least certain of said movable load supporting elements comprises a pair of angularly arranged arms secured to one another and pivoted to said elongated support member for swinging movement of said arms in a generally horizontal plane, each of said arms of each pair when in operative position being adapted to project generally perpendicularly outwardly from said support member for supporting a load thereon with the other arm of the respective pair being disposed in an inoperative position and extending generally adjacent said support member, and wherein one arm of each pair is of greater length than the other arm of the respective pair, for selectively varying the extent of forward projection of the operative load supporting arm with respect to said support member upon swinging of the respective load supporting element.

6. A load transfer and storage mechanism in accordance with claim 4 including at least two of said movable load supporting elements disposed on each side of the transverse vertical center plane of said support member, and linkage means coacting between said two load supporting elements for causing concurrent pivoting of said two load supporting elements upon actuation of said linkage means.

7. A load transfer and storage mechanism in accordance with claim 4 wherein said means for providing surface bearing comprises an upwardly facing hemispherical surface on each seat member and a complementary downwardly facing hemispherical surface on each of said hanger means coacting in relative movable engaged relation.

8. A load transfer and storage mechanism in accordance with claim 5 wherein each of said certain movable supporting elements comprises a generally vertically oriented trunnion projecting from the respective pair of arms generally adjacent a juncture of said arms and coacting in rotatable mounted relation with said support member.

9. In a load transfer and storage mechanism comprising a storage frame for receiving loads therein, a load carrier having an extractor including load supporting means, for handling loads, said load carrier being movable along a travel zone disposed adjacent said storage frame for depositing loads into and removing loads from said storage frame, said load supporting means comprising spaced normally generally horizontally oriented means for supporting a load thereon, at least certain of said normally generally horizontally oriented means being movably mounted on said load carrier for movement with respect thereto in a generally horizontal plane, said extractor comprising a carriage, means for moving said carriage laterally of said travel zone and toward and away from load receiving stations in said storage frame, said load supporting means comprising an elongated generally horizontally oriented beam supported on said carriage with a plurality of spaced tines projecting generally horizontally outwardly from said beam for supporting a load thereon, said tines defining said generally horizontally oriented means, at least two pair of said generally horizontally oriented tines being disposed on opposite sides of the transverse vertical center plane of said beam and being movable in a generally horizontal plane with respect thereto, the tines of each of said pairs being operatively coupled to one another by means of a linkage, and power means operatively coupled to said beam and to said linkage for actuating said movable tines with respect to said beam, said linkage comprising a plurality of elongated sections, and means detachably coupling and sections together.

References Cited

UNITED STATES PATENTS

| | | | |
|---|---|---|---|
| 2,698,698 | 1/1955 | Smith et al. | 214—750 X |
| 2,849,131 | 8/1958 | Smith et al. | |
| 2,897,985 | 8/1959 | Carlson et al. | 214—75 |
| 3,106,305 | 10/1963 | Gehring | 214—730 |
| 3,107,803 | 10/1963 | Glosup et al. | 214—514 X |
| 3,175,722 | 3/1963 | Paulssen. | |
| 3,232,465 | 2/1966 | Romine et al. | 214—730 |
| 3,268,097 | 8/1966 | Armington et al. | |

FOREIGN PATENTS

| | | |
|---|---|---|
| 1,019,969 | 11/1957 | Germany. |
| 1,179,513 | 10/1964 | Germany. |

GERALD M. FORLENZA, Primary Examiner

RAYMOND B. JOHNSON, Assistant Examiner

U.S. Cl. X.R.

212—128; 214—730, 731, 750